Jan. 10, 1961
W. H. HIGA
2,968,031
ELECTRONIC MICROMETER
Filed Feb. 24, 1955
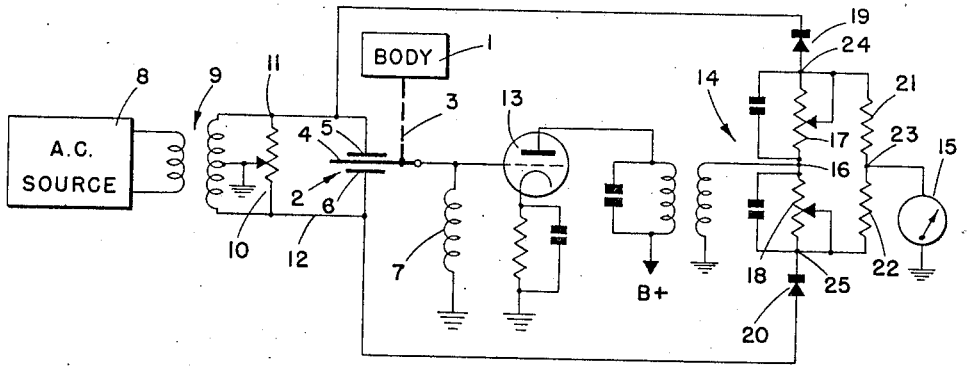
FIG. 1
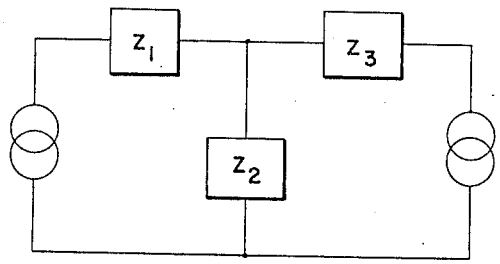
FIG. 2
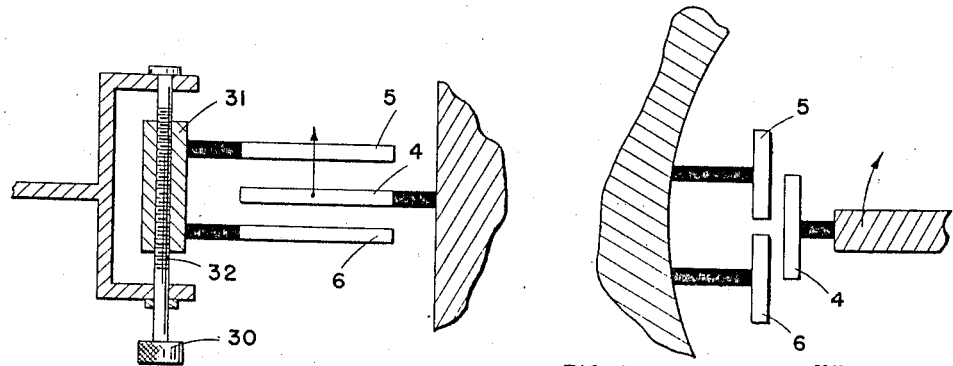
FIG. 3
FIG. 4
INVENTOR.
WALTER H. HIGA
BY
William L. Lane
ATTORNEY 2,968,031
Patented Jan. 10, 1961

2,968,031

ELECTRONIC MICROMETER

Walter H. Higa, Pasadena, Calif., assignor to
North American Aviation, Inc.

Filed Feb. 24, 1955, Ser. No. 490,345

5 Claims. (Cl. 340—265)

This invention relates to apparatus for detecting and measuring minute mechanical displacements.

It is frequently desirable to have an apparatus which produces a signal output which is a function of the mechanical displacement, either linear or rotational, of a body. This apparatus can readily be used to detect slight rotational movements of, for example, a stabilized platform about one of its output axes. Also in the materials testing art, particularly in the art of measuring the elasticity or strength of materials, it is desirable to have a highly accurate micrometer to measure minute deflections of a portion of the test specimen with reference to a second portion. In the transducer art, it is frequently desired to translate the small movements of a diaphragm, subjected to sound waves, into electrical signals. The apparatus described below has great utility in each of these fields and in many other fields not enumerated.

It is therefore an object of this invention to provide an improved electronic micrometer capable of translating minute mechanical displacements into electrical signals.

It is another object of this invention to provide an improved electronic micrometer utilizing a tuned resonant network and means responsive to a mechanical displacement for detuning the network.

It is a further object of this invention to provide an improved electronic micrometer utilizing a three element capacitive pick-off and an inductor T-connecting the pick-off and inductor between sources of substantially equal but 180° out-of-phase oscillatory voltages with the T-network resonant at the frequency of the sources when the three-element pick-off is balanced, and means responsive to a mechanical displacement for unbalancing the pick-off.

Further objects of invention will become apparent from the following description taken in connection with the accompanying drawings, in which Fig. 1 is a schematic diagram of the circuit utilized by the electronic micrometer contemplated by this invention;

Fig. 2 is a diagram of the equivalent T-network of a portion of the schematic of Fig. 1;

Fig. 3 is a view of a typical three-element capacitive pick-off utilized by the electronic micrometer contemplated by this invention; and Fig. 4 is a view of an alternative three-element capacitive pick-off utilized by the electronic micrometer contemplated by this invention.

Referring now to Fig. 1, a schematic drawing of the circuit utilized by the preferred embodiment of the electronic micrometer contemplated by this invention is shown. This micrometer is utilized to detect and measure minute deflections of external body 1 from a predetermined null position. As long as body 1 remains in its null position three element capacitive pick-off 2 is in a balanced or null condition. In this condition the capacitance between plates 4 and 5 is equivalent to the capacitance between plates 4 and 6. When body 1 is displaced, mechanical linkage 3 displaces movable plate 4 a corresponding amount thereby unbalancing pick-off 2.

Inductor 7 is connected between movable plate 4 and a reference point shown as ground. Three element capacitive pick-off 2 and inductor 7 therefore form a T-network with the inductor as the shunt arm and the capacitors 5—4 and 4—6 as the series arms. Source 8 is a source of constant frequency oscillatory signals. These signals are coupled through transformer 9 and shunting potentiometer 10 to pick-off 2. The grounded center tap of the secondary winding of transformer 9 and the grounded wiper on shunt potentiometer 10 insure that lines 11 and 12 are subjected to oscillatory potentials of substantially equal magnitude but with a 180° phase relationship. The T-network is thereby connected between voltage sources which are substantially equal but of opposite polarity. The values of the capacitances between the plates of pick-off 2 and of inductor 7 are selected to form a resonant network at the frequency of source 8 when movable plate 4 is in the balanced condition. This tuned network preferably has a high figure of merit Q, that is, the inductive reactance of inductor 7 is high compared to its resistance. A ratio Q of inductive reactance to resistance of 50 has been found to give good results.

Referring now to Fig. 2, the equivalent network of the T-network connected to the source of two 180° out-of-phase signals is shown. Impedances $Z_1$ and $Z_3$ comprise not only the capacitive reactance of half of the pick-off but also include the impedances of the source. Impedance $Z_2$ comprises not only the inductive reactance of the inductor but also small resistances and distributive capacitive reactances of the input circuit to amplifier 13. From this network the magnitudes of the frequency, capacitance and inductance needed to make up a resonant circuit with a high figure of merit are readily found by means well known to those skilled in the art.

Referring once again to Fig. 1, as long as plate 4 is in its balanced position it is maintained at ground potential, and the input to amplifier 13 is zero. As soon as plate 4 is displaced a slight amount by the action of body 1 through linkage 3, pick-off 2 is unbalanced. Because the T-network is still in the vicinity of resonance, although detuned slightly by the movement of plate 4, a comparatively large potential is placed across inductor 7. The phase of this potential is a measure of the direction of movement of plate 4, while the magnitude of the potential across inductor 7 is, within a narrow range, a predetermined function of the distance plate 4 is moved. In the ordinary capacitive type pick-off network the amplitude of the signal voltage developed at the movable plate is determined by the voltage division characteristics of the capacitance network formed by the pick-off capacitances in series with the amplifier's input capacitance. Utilizing the above described T-network, the signal voltage is increased many-fold by completing the pick-off circuit through inductor 7, so selected in value to normally provide a resonance condition. Thus, the signal voltage amplitude is increased by a factor substantially equivalent to the figure of merit Q, or 50 times in the above example.

The signal voltage across inductor 7 is amplified by amplifier 13. The signal from amplifier 13 is coupled to phase sensitive detector 14 which produces a D.-C. output voltage across meter 15. This output voltage has a polarity which is determined by the phase of the input from amplifier 13 and, hence, is determined by the direction of movement of plate 4. The output voltage has a magnitude which is a predetermined function of the magnitude of the input signal from amplifier 13, and, hence, is a function of the magnitude of the displacement of plate 4. The dial on meter 15 is preferably calibrated to read directly in terms of positive and negative linear or angular displacements. This calibration can readily be accomplished by experimental means.

In phase-sensitive detector 14 the amplified signal from amplifier 13 is coupled to common terminal 16 of two RC networks 17 and 18. RC networks 17 and 18 form a series load circuit through rectifiers 19 and 20 across lines 11 and 12. A summing network consisting of resistors 21 and 22 and meter 15 provides a voltage at terminal 23 which is proportional to the algebraic sum of the voltages at terminals 24 and 25. As long as terminal 16 is not subjected to a signal from amplifier 13, i.e., as long as pick-off 2 is in a balanced condition, the voltages at terminals 24 and 25 are equal and opposite. Under these conditions, terminal 23 is at ground potential. A signal from amplifier 13 results in one of terminals 24 and 25 having a greater potential than the other. The relative phase of the input signal from amplifier 13 with respect to the signal from lines 11 and 12 determines which of terminals 24 or 25 acquires the greater potential. The magnitude of the signal from amplifier 13 determines the relative magnitudes of the voltages at terminals 24 and 25.

Figs. 3 and 4 are views of two typical three element capacitive pick-offs. In both instances, plates 4, 5 and 6 are electrically insulated from their supports. In Fig. 3, rotation of plate 4 about a pivot point (not shown) results in inversely varying the capacitances between plate 4 and plates 5 and 6 by changing the relative spacing between the plates. Thus, if plate 4 is rotated in the direction of the arrow this decreases the space between plates 4 and 5, thereby increasing the capacitance; and increases the space between plates 4 and 6, thereby decreasing this capacitance. In Fig. 4, rotation of plate 4 about a pivot point (not shown) results in inversely varying the capacitances between plate 4 and plates 5 and 6 due to the change in the relative areas of the capacitors. Thus, if plate 4 is rotated in the direction of the arrow, the effective area of overlap of plates 4 and 5 increases, thereby increasing the capacitance between the plates; while the effective area of overlap between plates 4 and 6 decreases, thereby decreasing the capacitance between these plates.

Referring again to Fig. 3, a typical method of adjusting the relative position of plates 4, 5 and 6 is shown. By rotating knob 30, plate support 31 is made to travel up or down threaded screw 32. This movement effectively adjusts the null position of the capacitive pickoff.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electronic micrometer for detecting and measuring minute mechanical displacements comprising a normally balanced three-element, capacitive pickoff sensitive to said mechanical displacements; an impedance connected to said capacitive pickoff to form thereby a T-network, said impedance having a single reactive component which resonates with the reactances of said pickoff at a predetermined frequency when said pickoff is balanced; a source of alternating signals of said predetermined frequency; means connecting said T-network to said source in a manner to subject opposite ends of said network to substantially equal voltages of opposite polarity; and indicator means sensitive to the phase and magnitude of the voltage across said impedance whereby the output of said indicator means is a predetermined function of said mechanical displacement.

2. An electronic micrometer for detecting and measuring minute mechanical displacement of a body from a null position comprising a normally balanced three-plate capacitive pickoff, one plate being movable with respect to the other two plates, said movement being characterized by a variation of the capacitance between said movable plate and a second of said plates which is inverse of the variation of the capacitance between said movable plate and the third of said plates; a single inductor having one end electrically connected to said movable plate to thereby form a T-network with said inductor being the shunt impedance; a source of constant frequency voltages, the frequency of said voltages being the resonant frequency of said T-network when said movable plate is in a predetermined null position with respect to said other plates; means connecting said T-network between two substantially equal in magnitude voltages from said source, said voltages being 180° out-of-phase with one another; means responsive to the deviations of said body from said null position for displacing said movable plate a corresponding amount from its null position in said pickoff; and indicator means sensitive to the phase and magnitude of the voltage across said inductor whereby the output of said indicator means is a predetermined function of the movement of said body.

3. An electronic micrometer as recited in claim 2 in which said indicator means comprises two substantially equal load networks connected in series, two rectifiers connected in series with said load networks in a manner to freely allow current flow in one direction while retarding current flow in the opposite direction, one of said rectifiers being connected at each end of said series-connected load networks; means connecting said series-connected rectifiers and load networks across said second and third plates of said pickoff; amplifier means subjected to the voltage across said inductor and having its output coupled to the common terminal between said load networks; and a summing network having inputs connected to each end of said series-connected load networks and an output which is a function of the algebraic sum of the inputs whereby the magnitude and polarity of said output of said summing network is a predetermined function of the magnitude and direction of movement of said body.

4. An electronic micrometer for detecting and measuring the amplitude and direction of minute mechanical displacements comprising a normally balanced three-element reactive pickoff; an impedance connected to said reactive pickoff to form thereby a T-network, said impedance having a reactive component which resonates with the reactances of said pickoff at a predetermined frequency when said pickoff is balanced; a source of alternating signals of said predetermined frequency, said signals being of equal magnitude but opposite polarity and connected to opposite ends of said T-network; a means for amplifying the signal across said impedance; means responsive to said mechanical displacement for unbalancing said pickoff whereby the T-network is detuned; and a phase sensitive detector which combines said source signals with the amplified signal from across said impedance element and produces a D.-C. voltage having an amplitude and polarity which are functions of the magnitude of displacement of said body and the direction of its movement.

5. An electronic micrometer for detecting and measuring the amplitude and direction of minute mechanical displacements comprising a capacitive pickoff having three substantially parallel plates, one of which is movable with respect to the other two plates, and in which the capacitances between said movable plate and each of said other plates are normally equal; a source of two constant frequency signals of substantially equal magnitudes but opposite polarity; an inductor having a high figure of merit, one end of said inductor being connected to said movable plate to form thereby a T-network, said inductor being of a magnitude to form a resonant network at the frequency of said source when said capacitive pickoff is unactuated; means connecting said T-network between said two constant frequency signals of said source; means responsive to said mechanical displacement for changing the capacitance between said movable plate and the other plates whereby the phase and magnitude of the signal across said inductor are a function of the direction and magnitude of said mechanical displacement; means for amplifying said signal across said inductor; a phase sensitive detector including two rectifiers directly connected to said source signals whereby said source signals are combined with the amplified signal from across the inductor, said phase detector producing a D.-C. voltage having an amplitude and polarity which are functions of the magnitude and direction of said mechanical displacement.

References Cited in the file of this patent

UNITED STATES PATENTS

| | | |
|---|---|---|
| 2,025,719 | Blau | Dec. 31, 1935 |
| 2,111,442 | West | Mar. 15, 1938 |
| 2,288,838 | Pike et al. | July 7, 1942 |
| 2,414,224 | Douglas | Jan. 14, 1947 |
| 2,452,156 | Schover | Oct. 26, 1948 |
| 2,514,847 | Coroniti | July 11, 1950 |
| 2,548,790 | Higinbotham et al. | Apr. 10, 1951 |
| 2,611,964 | Buisson | Sept. 30, 1952 |
| 2,703,876 | Edmundson et al. | Mar. 8, 1955 |
| 2,732,625 | Buisson | Jan. 31, 1956 |

FOREIGN PATENTS

| | | |
|---|---|---|
| 984,927 | France | Mar. 7, 1951 |
| 1,009,689 | France | June 3, 1952 |